United States Patent Office 3,510,533
Patented May 5, 1970

3,510,533
DIMERIZATION OF CONJUGATED DIENES WITH π-ALLYLDINITROSYLIRON COMPLEXES
Perry L. Maxfield, Bartlesville, Okla., assignor to Phillips Petroleum Company, a corporation of Delaware
No Drawing. Original application Sept. 2, 1966, Ser. No. 576,821, now Patent No. 3,448,129, dated June 3, 1969. Divided and this application Dec. 16, 1968, Ser. No. 840,541
Int. Cl. C07c 11/16, 3/18
U.S. Cl. 260—666     7 Claims

ABSTRACT OF THE DISCLOSURE

Dimerization of conjugated dienes by contact with a catalyst comprising π-allyldinitrosyliron complexes of germanium, tin and lead.

---

This is a divisional application of my copending application having Ser. No. 576,821, filed Sept. 2, 1966, now Patent No. 3,448,129 issued June 3, 1969.

This invention relates to a novel catalyst, and to a dimerization process employing said catalyst. In one of its aspects, the invention relates to new complex π-allylic compounds of iron.

In another aspect, the invention relates to the dimerization of unsaturated hydrocarbons in the presence of a catalyst comprising complex π-allylic compounds of iron.

In another aspect, the invention relates to the homo-dimerization of acyclic conjugated dienes containing up to about 12 carbon atoms per molecule by contacting said dienes with the complex catalyst of this invention.

In another aspect, the invention relates to the co-dimerization of two different conjugated dienes by contacting these compounds with a complex catalyst comprising complex π-allylic compounds of iron.

In another aspect, the invention relates to the essentially quantitative production of 4-vinylcyclohexene by contacting 1,3-butadiene with the complex catalyst of this invention at temperatures substantially lower than those required to dimerize, 1,3-butadiene without a catalyst.

Numerous catalysts have been proposed to dimerize conjugated dienes such as 1,3-butadiene, to higher molecular weight cyclic unsaturated compounds such as 4-vinylcyclohexene. For example, the reaction of 1,3-butadiene takes place very slowly at ambient temperatures without a catalyst while at temperatures above 100° C. the conversion is rapid and accompanied by higher molecular weight polymerization products. It is an object of this invention to provide a new dimerization process and a catalyst therefor which can be used at moderate temperatures to produce essentially quantitative yields, that is, without formation of other polymeric by-products. A further object of the invention is to provide a long lasting catalyst for homo- and co-dimerization processes. It is a particular object of the invention to provide a catalyst, and a process employing said catalyst, for the formation of vinylcyclohexene from 1,3-butadiene in high yields at moderate temperatures.

Other aspects, objects, and the several advantages of the invention will be apparent to one skilled in the art from studing the specification and claims.

In accordance with the invention, a new composition of matter is provided having the formula:

[(CHR—CR—CH₂)(NO)₂Fe]₂MX₂ wherein (CHR—CR—CH₂) is an allylic radical π-bonded to the iron atom and in which R is hydrogen or a methyl radical; M is one of tin, lead, or germanium; and X is one of chloride, bromide, iodide, or a σ-bonded hydrocarbon radical preferably having up to 20 carbon atoms.

The σ-bonded hydrocarbon radicals are aliphatic or cyclo-aliphatic or aromatic. Examples are: allyl, phenyl, benzyl, 4-tolyl, 4-methyl-6-heptynyl, cyclopentyl, 12-eicosenyl, and 2-naphthyl. Said complex composition of matter has particular utility as a catalyst for the dimerization of conjugated dienes.

As used herein, the term "dimerization" refers to homo-dimerization of acyclic conjugated dienes, and to the co-dimerization of two different acyclic conjugated dienes.

A specific example of the novel complex compounds of this invention is bis(π-allyldinitrosyliron)tin dichloride whose structure is believed to be

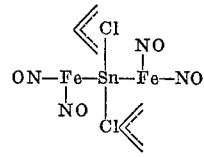

(Note:  represents π-bonded allyl radical.)

Another novel catalyst composition is bis(π-allyldinitrosyliron)allyltin chloride whose structure is believed to be

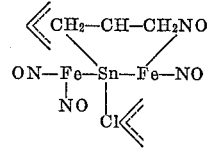

Other examples of the novel compounds provided by this invention include:

bis(π-allyldinitrosyliron)germanium dibromide
bis(π-methallyldinitrosyliron)germanium dichloride
bis(π-crotyldinitrosyliron)tin diiodide
bis(π-allyldinitrosyliron)lead dichloride
bis[π-(2-methylcrotyl)dinitrosyliron]lead dibromide
bis(π-methallyldinitrosyliron)tin chloride bromide
bis(π-allyldinitrosyliron)methyl tin bromide
bis(π-methallyldinitrosyliron)phenylgermanium chloride
bis(π-crotyldinitrosyliron)benzyllead iodide
bis[π-(2-methylcrotyl)dinitrosyliron]4-tolyltin chloride
bis(π-allyldinitrosyliron)4-methyl-6-heptynyllead bromide
bis(π-allyldinitrosyliron)cyclopentyltin chloride
bis(π-methallyldinitrosyliron)12-eicosenyltin chloride
bis(π-allyldinitrosyliron)2-naphthylgermanium iodide.

The method of preparing these novel compositions broadly comprises reacting μ,μ'-dihalotetranitrosyldiiron (the dimer of dinitrosyliron halide) and an allyl or substituted allylmetal or halide compound. These compositions can be prepared by several methods:

METHOD A

Under an inert atmosphere, an equimolar mixture of μ,μ'-dihalotetranitrosyldiiron (halo-chloro, bromo, or iodo) and an allyl, methallyl, crotyl, or 2-methylcrotyl compound of tin, germanium, or lead is mixed in the presence of any suitable inert diluent, preferably an inert hydrocarbon such as benzene. Any order of addition can be used, as well as any convenient temperature and pressure, room temperature and atmospheric pressure being convenient. It is preferred that the mixture be allowed to stand at least one hour after the initial mixing before it is used in a catalytic reaction. During the standing period a fine precipitate may settle out. This may be removed, if desired, for convenience by centrifugation or filtration.

The catalytic solution is somewhat air and moisture sensitive and should be kept under an inert atmosphere. It should be used within a few days of its preparation for best results.

If desired, the catalytic compound can be isolated from the above solution by conventional crystallization techniques. The isolated and dried solid is relatively stable to the atmosphere and has a considerably longer shelf life than its solution.

METHOD B

Under an inert atmosphere, 1 mole of $\mu,\mu'$-dihalotetranitrosyldiiron (as above), 1 mole of tin, germanium, or lead dihalide (chloride, bromide, iodide), 2 moles of allyl, methallyl, crotyl, or 2-methylcrotyl chloride, bromide, or iodide, and at least 4/3 mole of Al powder (or its equivalent in other reducing metals, such as powdered Zn, Fe, Mg, or reducing compounds such as cobaltocene) are mixed, in any order, in the presence of any suitable inert solvent, tetrahydrofuran being particularly suitable. After mixing the solution is stirred, preferably for several hours under any convenient conditions such as room temperature or higher. The solution is then used as the solution of Method A.

METHOD C

Under an inert atmosphere are mixed 1 mole of $\mu,\mu'$-dihalotetranitrosyldiiron, 2 moles of powdered tin, germanium, or lead metal, and 2 moles of an allylic halide (as above) in an inert solvent such as tetrahydrofuran. After a suitable reaction period, 1–10 hours at room temperature for example, the solution is used as the solution of Method A.

METHOD D

Under an inert atmosphere are mixed 2 moles of Roussin's black salt $KFe_4S_3(NO)_2$ (or 3 moles of Roussin's red salt $[Fe(NO)_2SEt\,^1]_2$) 6 moles of cadmium halide, 3 moles of a tetrallylic tin, germanium, or lead compound, and at least 3 moles of powdered zinc or its equivalent of another reducing agent such as powdered aluminum, sodium borohydride, cobaltocene, and the like. The mixing is continued until the catalyst formation is substantially complete, about 1–10 hours at room temperature for example. After the reaction period, the solution is used as in Method A. (A $\mu,\mu'$-dihalotetranitrosyldiiron or a derivative is believed to be an intermediate in this preparation.)

METHOD E

To prepare the catayic compounds having a hydrocarbon radical $\sigma$-bonded to the tin, germanium, or lead atom, one mole of the products obtained from Methods A through D (whether isolated solid or in solution) is treated with 1–2 moles of hydrocarbyl magnesium halide or a hydrocarbyl alkali metal, alkaline earth metal, or aluminum compound. The treatment is carried out in any suitable solvent, such as the ethers or hydrocarbons previously mentioned, at temperatures generally lower than room temperature. After a reaction time of at least about one hour, the solution can be used in a catalytic process or the catalytic composition can be isolated by crystallization. Both the solution and isolated solids are preferably protected from the atmosphere and both the solution and solid should be utilized within a few days.

The $\mu,\mu'$-dihalotetranitrosyldiiron reagents used in the above synthesis techniques can be prepared by any conventional method known in the art. A particularly convenient procedure is that described in copending Ser. No. 518,018, filed Jan. 3, 1966. If desired, the preparation of the $\mu,\mu'$-dihalotetranitrosyldiiron compound and the complex $\pi$-allylic iron compounds of the present invention can be sequentially prepared in the same vessel and in the same solvent without isolation of the former.

Method A has been used to synthesize some of the novel compounds of this invention: For example, by contacting $\mu,\mu'$-dichlorotetranitrosyldiiron with tetrallyltin in the presence of benzene, bis($\pi$-allyldinitrosyliron) tin dichloride is formed. By treating this compound with allylmagnesium bromide (Method E), bis($\pi$ allyldinitrosyliron) allyltin chloride is formed.

As an example of Method B, $\mu,\mu'$-dibromotetranitrosyldiiron is contacted with powdered aluminum metal in the presence of lead (II) chloride and methallylchloride to give bis(methallyldinitrosyliron)lead dichloride. When this compound is contacted with phenylsodium, bis(methallyldinitrosyliron)phenyllead chloride is obtained.

As an example of Method C, $\mu,\mu'$-dichlorotetranitrosyldiiron is mixed with powdered germanium and crotyl bromide in the presence of tetrahydrofuran, resulting in the production of bis($\pi$-crotyldinitrosyliron)germanium dibromide. Treatment of this compound with butyllithium results in the production of bis($\pi$-crotyldinitrosyliron) butylgermanium bromide.

As an example of Method D, $KFe_4S_3(NO)_7$ is mixed with tetraallyltin, cadmium iodide, powdered zinc, and sodium borohydride in ethyl ether to produce a solution containing bis($\pi$-allyldinitrosyliron)tin diiodide.

The conjugated dienes to which this process is directed include those acyclic conjugated dienes having up to about 12 carbon atoms per molecule, or mixtures thereof. Some specific examples of these are: 1,3-butadiene, isoprene, piperylene, 2,3-dimethylbutadiene-1,3, 1,3-hexadiene, 2,4-octadiene, 2-methylpentadiene-1,3, 4-ethyldecadiene-1,3, and the like.

According to the dimerization process of this invention, the conjugated diene is contacted with the catalyst at a temperature within the range of from about 0 to about 100° C., preferably 20–60° C. The conttact can be carried out either batchwise or continuously using any conventional contacting apparatus. In batch reactions, the catalyst mixtures can be prepared either in the reaction vessel before the addition of the conjugated diene or in a separate vessel and then pumped to the dimerization vessel. The dimerization can be carried out at any convenient pressure which is sufficient to maintain a substantially liquid state. Pressures ranging from 0 to about 1,000 p.s.i.g. can be used. The contact time will vary according to the efficiency of the contacting technique, the reaction temperature, and the desired degree of conversion, but will generally be in the range of from about 1 minute to about 10 hours, preferably 30–90 minutes. The catalyst usage will be in the range of from about 0.001 to 10, preferably 0.01–1 millimole of iron per mole of conjugated diene. Diluents, such as ethers and inert hydrocarbons, can be used in the reaction zone but the reaction is preferably carried out substantially in the absence of substantial amounts of diluent.

After completion of the reaction, the dimeric products are recovered by any conventional technique such as by fractionation, crystallization, adsorption, and the like. If desired, the crude reaction product can be treated first with an aqueous inorganic acid to destroy and/or remove the catalyst.

The invention can be further illustrated by the following examples.

EXAMPLE I

Preparation of bis($\pi$-allyldinitrosyliron)tin dichloride

The title compound was prepared by mixing 4 ml. of a tetrahydrofuran solution of $\mu,\mu'$-dichlorotetranitrosyldiiron, 10 ml. dry benzene, 1.0 ml. of tetraallyltin, and 0.25 ml. thiophene. After standing for several days, the mixture was centrifuged to remove inorganic solids which had precipitated and then cooled to −78° C. to produce orange crystals. Recrystallization from warm toluene gave about 0.75 g. of crystals, M.P. 132° C. with decomposition. In other runs, it was found that the thiophene could be omitted without affecting the results.

Elemental analysis calculated for $C_6H_{10}Cl_2Fe_2N_4O_4Sn$ showed the following:

Calculated for $C_6H_{10}Cl_2Fe_2N_4O_4Sn$—C, 14.30; H, 2.00;

---
[1] Et=ethyl=$C_2H_5$.

Cl, 14.08; Fe, 22.18; N, 11.12; Sn, 23.62; mol. wt.,[1] 503.7. Found: C, 14.7; H, 2.2; Cl, 14.4; Fe, 23.1; N, 10.7; Sn, 21.7; mol. wt., 487.

The tetrahydrofuran solution of the $\mu,\mu'$-dichlorotetranitrosyldiiron reagent used in the above synthesis was prepared by treating a mixture of 16 g. (0.1 mole) of anhydrous ferric chloride and 15 g. iron powder under nitrogen with 65 ml. of tetrahydrofuran. The resulting reaction mixture was stirred at a high speed for 25 minutes and heated externally as needed to maintain reflux. During this time the yellow ferric chloride was reduced to gray ferrous chloride. After addition of 65 ml. of dry benzene, nitric oxide was bubbled through the refluxing mixture at a rate of 0.25 l/min. for 90 minutes. The solution was then cooled and stored under nitrogen at −5° C. The solution of $\mu,\mu'$-dichlorotetranitrosyldiiron contained about 2.4 millimoles dissolved iron per ml. Only about 30 percent of the iron, however, was in the form of the $\mu,\mu'$-dichlorotetranitrosyldiiron compound, the remaining iron being in the form of soluble by-products of the catalyst formation.

The infrared spectrum of this material is consistent with the indicated structure of this compound and shows that the allyl groups are $\pi$-bonded to the iron atom.

EXAMPLE II

Preparation of bis($\pi$-allyldinitrosyliron)tin dichloride (Method B)

In this preparation, 4.0 ml. of the $\mu,\mu'$-dichlorotetranitrosyldiiron solution (Example I) was stirred under nitrogen for several hours with 10 ml. of dry tetrahydrofuran, 1.0 g. of aluminum powder, 1.0 g. of anhydous tin dichloride, and 0.75 ml. of allyl chloride. Chilling this reaction mixture produced orange crystals which gave an infrared spectrum which was identical to that obtained by the crystals of Example I.

EXAMPLE III

Preparation of bis($\pi$-allyldinitrosyliron)tin dichloride (Method C)

The catalyst solution was prepared by stirring, at room temperature and under a nitrogen atmosphere for 3–5 hours, a mixture of 4.0 ml. of the $\mu,\mu'$-dichlorotetranitrosyldiiron solution (from Example I), 10 ml. of dry tetrahydrofuran, 1.0 g. of powdered tin metal, and 0.75 ml. allyl chloride. After standing several hours, the deep orange soltuion was centrifuged to remove inorganic solids and was then found active for dimersization of butadiene.

EXAMPLE IV

Preparation of bis($\pi$-allyldinitrosyliron)tin dichloride (Method D)

In this example, the catalyst was prepared by stirring at 50° C., a mixture of 0.17 g. of Roussin's black salt, $KFe_4S_3(NO)_7$, 0.11 g. of anhydrous cadmium chloride, 10 ml. of dry tetrahydrofuran, 0.2 ml. of tetraallyltin, and 0.1 g. of powdered zinc. After stirring for about an hour, the solution was found active for butadiene dimerization.

The Roussin's black salt (used in the above paragraph) was prepared by adding to a boiling solution of 18 g. potassium nitrite in 200 ml. of water in a 2-liter beaker, a solution of 20 g. of sodium hydrosulfide in 200 ml. of water. A solution of 80 g. of ferrous sulfate heptahydrate with a drop of sulfuric acid in 600 ml. of water was then poured slowly into the heated solution. After heating in a hot water bath (85–90° C.) for 30 minutes, the mixture was filtered hot, 10 ml. of 30 percent potassium hydroxide solution was added and it was allowed to stand at room temperature for 20 hours. The black crystals were recovered by filtration and recrystallized from acetone and dried for 24 hours over tridecylaluminum, yielding about 8 grams.

EXAMPLE V

Preparation of bis($\pi$-allyldinitrosyliron)allyltin chloride (Method E)

Orange crystals of bis($\pi$-allyldinitrosyliron)tin dichloride prepared in Example I were treated with an equimolar amount of allylmagnesium bromide at −78° C. The orange crystals which were crystallized from this mixture were isolated and found to have infrared absorption bands for both $\pi$-allyliron and allyltin groups. An elemental analysis which was carried out on this compound agreed with the empirical formula $C_9H_{15}ClFeN_4O_4Sn$ indicating that one chlorine of the original molecule had been replaced with an allyl group to give bis($\pi$-allyldinitrosyliron)allyltin chloride.

EXAMPLE VI

Dimerization of 1,3-butadiene to 4-vinylcyclohexane

Butadiene-1,3 was dimerized to 4-vinylcyclohexene (VCH) using catalysts of the present invention with essentially a quantitative ultimate yield (no by-products were detected) in a number of batch runs carried out in 100–500 ml. stirred glass reactors immersed in a 40° C. water bath. Part of the total butadiene charge, generally about 350 g., was present in the reactor initially and the rest was added as the reaction proceeded. The reaction was virtually complete in about 2 hours when the catalyst was added in the form of the solution in which it was originally prepared. When the catalyst was added in the form of its isolated solid crystals, the reaction, which was carried out at room temperature in this case, took longer (about 24 hours) apparently due to the lower temperature and the time required for complete catalyst solution.

The following table shows the results obtained using several catalysts of the present invention for the dimerization of 1,3-butadiene.

TABLE I.—CATALYTIC DIMERIZATION OF BUTADIENE CATALYST SYSTEM

| Run No. | Catalyst | Preparation | Quantity | Productivity, kg. VCH/g. mole Fe |
|---|---|---|---|---|
| 1 | $[(C_3H_5)(NO)_2Fe]_2SnCl_2$ | Soln. of Example I | 0.6 mmole Fe | 570 |
| 2 | $[(C_3H_5)(NO)_2Fe]_2SnCl_2$ | Crystallized solid of Example I. | 73.6 mg | 870 |
| 3 | $[(C_3H_5)(NO)_2Fe]_2C_3H_5SnCl$ | Crystallized solid of Example V. | 3.1 mg | 2,500 |

The foregoing data illustrate that the invention catalyst and process are not only very selective, but they are also capable of producing 4-vinyl-cyclohexene from 1,3-butadiene in very high yields based on the amount of catalyst used.

EXAMPLE VII

Dimerization and co-dimerization of other conjugated dienes

Using the same general procedure described in Example VI, isoprene was dimerized, piperylene was dimerized, and a mixture of isoprene and butadiene were co-dimerized using, as a catalyst, a solution of the bis($\pi$-allyldinitrosyliron)tin dichloride prepared in Example I. The results of these tests are shown in the following table.

---
[1] Molecular weight.

TABLE II

| Run No. | Charge | Dimeric products |
|---|---|---|
| 4 | 20 ml. isoprene | 1 g. 1,4-dimethyl-4-vinylcyclohexene. |
| 5 | 160 ml. piperylene | 8.4 g. 3(or 6)-methyl-4-propenylcyclohexene. |
| 6 | 120 ml. isoprene, 120 ml. 1,3-butadiene. | 46 g. 1-methyl-4-vinylcyclohexene, 39 g. 4-vinylcyclohexene, 7.6 g. 1,4-dimethyl-4-vinylcyclohexene. |

EXAMPLE VIII

Continuous preparation of 4-vinylcyclohexene

Butadiene was dimerized to 4-vinylcyclohexene in a continuous process using the catalyst as prepared in Example II. The reactor was tubular being constructed from a 20 foot length of ⅜" OD stainless steel tubing which was wound into a coil and immersed in a temperature controlled oil bath. The reactor was fed by means of a pump, from an ice-chilled tank containing a prepared mixture of butadiene and catalyst. All portions of the reactor were dried and flushed with dry benzene before and between runs of the test. A pressure of 450 p.s.i.g. was maintained during the runs.

Table III shows a tabulated summary of the results of these runs.

TABLE III.—PRODUCTION OF 4-VINYLCYCLOHEXENE IN CONTINUOUS REACTOR

| Run No. | Catalyst | Butadiene, g. | Temp., °C. | Residence time, hr. | Productivity, kg. VCH/g. mole Fe |
|---|---|---|---|---|---|
| 7 | 2.4 mmoles Fe (catalyst soln. of Example I). | 290 | 40 | 2 | 90 |
| 8 | 0.6 mmoles Fe (catalyst soln. of Example I). | 270 | 60 | 1 | 360 |
| 9 | 0.6 mmoles Fe (catalyst soln. of Example I). | 228 | 80 | 1 | 100 |

The data in Table II show that the process is easily capable of continuous operation and, under the conditions stated, the preferred reaction temperature appear to be about 60° C. with a residence time of about 1 hour.

Reasonable variation and modification are possible within the spirit and scope of the invention, the essence of which is a new composition of matter having the formula $$[CHR\text{---}R\text{---}CR\text{---}CH_2)(NO)_2Fe]_2MX_2$$

and a process utilizing this composition as a catalyst for the dimerization of conjugated dienes.

I claim:
1. A process of dimerization comprising contacting at least one conjugated diene with a complex catalyst having the formula:

$$[(CHR\text{---}CR\text{---}CH_2)(NO)_2Fe]_2MX_2$$

wherein (CHR—CR—CH$_2$) is an allyl radical $\pi$-bonded to the iron atom and in which R is selected from hydrogen and a methyl radical, M is selected from tin, lead, and germanium, and X is selected from chloride, bromide, iodide, and a $\gamma$-bonded hydrocarbon radical.

2. A process as defined in claim 1 comprising contacting two different acyclic conjugated dienes.

3. A process as defined in claim 2 comprising contacting isoprene and piperylene with bis($\pi$-allyldinitrosyliron)tin dichloride.

4. A process as defined in claim 1 wherein the temperature is in the range of from about 25° to about 100° C.

5. A process as defined in claim 1 wherein said conjugated diene is 1,3-butadiene.

6. A process as defined in claim 5 wherein said complex catalyst comprises bis($\pi$-allyldinitrosyliron)tin dichloride.

7. A process as defined in claim 5 wherein said complex catalyst comprises bis($\pi$-allyldinitrosyliron)allyltin chloride.

References Cited
UNITED STATES PATENTS

| 3,448,129 | 6/1969 | Maxfield. |
| 3,436,431 | 4/1969 | Cardlin et al. |
| 3,377,397 | 4/1968 | Maxfield. |

DELBERT E. GANTZ, Primary Examiner

V. O'KEEFE, Assistant Examiner